(12) United States Patent
Gonzalez De Cossio Echeverria et al.

(10) Patent No.: US 12,253,368 B2
(45) Date of Patent: Mar. 18, 2025

(54) METHOD OF CHARACTERIZING A ROUTE TRAVELLED BY A USER

(71) Applicant: IFP Energies nouvelles, Rueil-Malmaison (FR)

(72) Inventors: Francisco Jose Gonzalez De Cossio Echeverria, Rueil-Malmaison (FR); Guillaume Sabiron, Rueil-Malmaison (FR); Laurent Thibault, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 78 days.

(21) Appl. No.: 17/368,421

(22) Filed: Jul. 6, 2021

(65) Prior Publication Data
US 2022/0011123 A1 Jan. 13, 2022

(30) Foreign Application Priority Data
Jul. 8, 2020 (FR) ..................................... 2007213

(51) Int. Cl.
*G01C 21/30* (2006.01)
*G01C 21/34* (2006.01)
*G06F 16/29* (2019.01)

(52) U.S. Cl.
CPC ..... *G01C 21/3423* (2013.01); *G01C 21/3446* (2013.01); *G01C 21/3453* (2013.01); *G06F 16/29* (2019.01)

(58) Field of Classification Search
CPC .......... B60W 60/001; B60W 2556/45; B60W 40/08; B60W 2556/50; B60W 50/14; B60W 30/0956; B60W 60/0027; B60W 2050/046; B60W 2554/4026; B60W 2554/4029; B60W 2554/4046; B60W 2554/406; B60W 2556/10; B60W 40/04; B60W 40/09; B60W 60/00276; G01C 21/3423; G01C 21/34;
(Continued)

(56) References Cited

U.S. PATENT DOCUMENTS 8,948,958 B1* 2/2015 Ferguson ................. G05D 1/00
701/28
2016/0362118 A1* 12/2016 Mollicone ............ G05D 1/0276
(Continued)

OTHER PUBLICATIONS

Besse Philippe C et al: "Review and Perspective for Distance-Based Clusterin of Vehicle Trajectories", IEEE Transactions on Intelligent Transportation Systems, IEEE, Piscataway, NJ, USA, vol. 17, No. 11. Nov. 1, 2016 (Nov. 1, 2016), pp. 3306-3317, XP011627030, ISSN: 1524-9050, DOI: 10.1109/TITS.2016.2547641.
(Continued)

*Primary Examiner* — Adam R Mott
*Assistant Examiner* — Heather J Keniry
(74) *Attorney, Agent, or Firm* — Fitch, Even, Tabin & Flannery LLP (57) ABSTRACT

The present invention is a method of characterizing a route (T) travelled by a user. The method comprises a step of locating and timestamping measurement during the ride (MES), then determining a modified discrete Fréchet distance (DFM) between the measured route and previous routes. Finally, the modified discrete Fréchet distance (DFM) is used to characterize the route to be characterized (T).

12 Claims, 5 Drawing Sheets

(58) Field of Classification Search
CPC .......... G01C 21/3446; G01C 21/3453; G01C 21/30; G06F 16/29
See application file for complete search history.

(56) References Cited

U.S. PATENT DOCUMENTS

| | | | |
|---|---|---|---|
| 2017/0268892 A1* | 9/2017 | Singh | G01C 21/3423 |
| 2018/0106631 A1* | 4/2018 | Myers | G01C 21/3415 |
| 2018/0348767 A1* | 12/2018 | Jafari Tafti | G08G 1/166 |
| 2019/0186939 A1* | 6/2019 | Cox | G06N 20/00 |
| 2020/0271458 A1* | 8/2020 | Berry | G01C 21/34 |
| 2020/0378775 A1* | 12/2020 | Beaurepaire | G01C 21/3423 |
| 2021/0020045 A1* | 1/2021 | Huang | G05D 1/692 |

OTHER PUBLICATIONS

Zbigniew Smoreda et al: "Spatiotemporal data from mobile phones for personal mobility assessment", Jan. 1, 2013 (Jan. 1, 2013), XP055297817, DOI: 10.1108/9781781902882-041 URL:http://citeseerx.ist.psu.edu/viewdoc/download?doi=10.1.1.649.8361&rep=repl&type=pdf.
John Doyle et al: "Utilising Mobile Phone Billing Records for Travel Mode Discovery", SSC, Jan. 1, 2011 (Jan. 1, 2011), XP055297821, *The entire document*.
F. Asgaria. Sultanh. Xiongv. Gauthierm.A. El-Yacoub!: 11 Ct-mapper: mapping sparse multimodal cellular trajectories using a multilayer transportation network 11, Comput. Commun., vol. 95, 2016, pp. 69-81, XP055297966.
Preliminary Search Report for FR 2007213 mailed Mar. 26, 2021.
Anderson, D. L. et al: "Quantitative Methods for Comparing Different Polyline Stream Network Models", Journal of Geographic Information System, vol. 06, No. 02, Jan. 1, 2014 (Jan. 1, 2014), pp. 88-98, XP093113113, ISSN: 2151-1950, DOI: 10.4236/jgis.2014.62010, 12 pages.
European Patent Office; European Office Action in corresponding European Patent Application No. 21 179 443.3-1009, dated Jan. 3, 2024; 20 pages.

* cited by examiner

METHOD OF CHARACTERIZING A ROUTE TRAVELLED BY A USER

CROSS-REFERENCE TO RELATED APPLICATIONS

This application claims priority from French Patent Application No. 20/07.213, filed Jul. 8, 2020, which are hereby incorporated herein by reference in their entirety.

BACKGROUND OF THE INVENTION

Field of the Invention

The present invention concerns the characterization of a route travelled by a user, notably the characterization of the belonging of the travelled route to a cluster of at least one of previous routes and the characterization of the user's transportation mode.

Transportation plays an essential role in our daily lives, on which the world economy is very much dependent. However, it also plays a major role in the air quality degradation and the $CO_2$ emissions increase, in particular in urban areas. According to the World Health Organization (WHO), transportation is one of the main sources of air pollution, and it is directly related to multiple respiratory and cardiovascular diseases. Besides, world transportation is responsible for about 24% of the direct $CO_2$ emissions from fuel combustion, of which nearly three quarters correspond to cars, trucks, buses and motorcycles, which makes global warming even worse. Examples of other harmful emissions are nitrogen oxides (NOx), tropospheric ozone ($O_3$) and particles (PM), which generally exceed the recommended limit values. The significance of the role played by transportation for air quality is also reflected in the increasing number of political actions carried out in Europe in recent years, which makes it a central issue. The strategies for addressing this problem are notably standards in terms of efficiency of low-carbon vehicles and fuels, low-emission vehicle development and inducement, tax policies and taxation systems.

However, one very important aspect that has not been examined in depth so far is the direct impact of the transportation mode selection on emissions. Indeed, from information relative to a route, one may consider implementing initiatives intended to encourage users to make alternative and more environmentally-friendly choices.

On the other hand, the technological development of portable devices and wireless communication has accelerated over the past years, notably by use of geolocation systems (GPS for example), smartphones, etc. It is thus possible to extract all kinds of information on users' travels all over the world of which the transportation mode used provides particularly valuable information. It is however difficult to reliably identify the transportation mode used from measurements, and it is also difficult to require a user to manually label each route a datum relative to the transportation mode in an application, in order to associate the measurements with a transportation mode. A first approach for identifying the transportation mode may be a speed-based approach. It is noted that such a speed-based approach involves major drawbacks since it disregards common phenomena such as traffic or weather conditions. As a consequence, there is a need for transport mode identification using all the data available from mobile devices provided with geolocation systems.

Furthermore, a first natural step towards this transportation mode identification objective reduces the data extent by grouping trajectories into representative clusters with similar characteristics. Each cluster can have a representative for which the transportation mode is easily available.

The trajectory clustering strategy however requires a carefully selected method for measuring the similarity between two given trajectories with raw GPS data tending to be asynchronous, undersampled, with variable sampling rates.

Geographic trajectory clustering based on a total or partial similarity measure can be used for a wide range of applications, for example: knowledge of users' trends, mobility forecasting, traffic control and optimum travel planning. Indeed, the clustering method can be interpreted as a data reduction technique for summarizing users' travels over a long period and with a high spatiotemporal resolution.

Measuring the similarity between a pair of routes is of utmost importance in a growing number of applications with the notions of distance between trajectories are the heart of problems such as trajectory clustering and classification. The usual choices regarding similarity measurement, for which there are many variants, notably include methods based on Fréchet distances, dynamic time warping (DTW), Hausdorff and Euclidean, and what is referred to as the longest common subsequence (LCSS). However, the first two measurements tend to be a more suitable choice for studying the trajectory of vehicles, considering the continuous and ordered nature thereof.

For example, the so-called Fréchet distance provides an effective compromise between generality and specificity. Indeed, it is invariant in relation to the speed of the trajectory, but it strongly depends on the continuous flow of the trajectory. The Fréchet distance between the trajectory A and B can be informally described as the length of the shortest leash allowing a person on a path A to walk their dog on a path B (without moving backwards). Dynamic time warping (DTW), introduced in the field of speech recognition as a similarity measure between time series, is also relevant.

In its continuous version, the Fréchet distance is given by the formula:

$$F(A, B) = \inf_{\alpha,\beta} \max_{t \in [0,1]} d(A(\alpha(t)), B(\beta(t)))$$

where A and B are curves in a metric space (distance d), and where $\alpha$ and $\beta$ represent different curve parametrizations. However, the Fréchet distance is sensitive to outliers. Now, it is common to have many outliers when using current geolocation systems or smartphones. Therefore, the Fréchet distance as such is not suited to characterize routes. Another limitation of the original Fréchet distance is the identification of similar trajectory portions.

For another application, the Fréchet distance is used notably in the method described in published U.S. patent application 2015/0,354,973 for positioning measurement signals on a route map (map matching).

Another difficulty related to measurements using geolocation systems or smartphones is the limited number of measurements available for some sections, notably underground sections. Such truncated measurements make it difficult to characterize a travelled route in a reliable and robust manner.

Although the field of research on inter-trajectory distances is extremely vast, less attention has been given to the performances of the corresponding clustering algorithms. The most common clustering methods are: k-means or medoid, spectral clustering, dbscan and hierarchical clustering analysis. The latter was used to predict the destination of drivers regarding the shape of the curves, as notably described in the document P. C. Besse, B. Guillouet, J.-M. Loubes, F. Royer, "Review and Perspective for Distance-based Clustering of Vehicle Trajectories", IEEE Transactions on Intelligent Transportation Systems, 17 (11): 3306-3317, 2016. Similarly, the clustering of vehicle trajectories obtained with an automated vision system is proposed in the document S. Atev, G. Miller, N. P. Papanikolopoulos, "Clustering of Vehicle Trajectories", IEEE Transactions on Intelligent Transportation Systems, 11 (3): 647-657, 2010. These methods are based on spectral clustering and they adapt the Hausdorff distance to meet their requirements. Other methods introduce a multi-characteristics similarity measure that can be used for trajectory clustering, notably for traffic monitoring and traffic congestion prediction.

The document F. Asgari, A. Sultan, H. Xiong, V. Gauthier, M. A. El-Yacoubi, "Ct-mapper: Mapping Sparse Multimodal Cellular Trajectories Using a Multilayer Transportation Network", Comput. Commun. 95, 69-81, 2016 proposes an unsupervised learning algorithm based on a hidden Markov model (HMM), which allows matching mobile phone traces over a transport network. This approach can be used to unify the information on the various transportation systems and analyse the multimodal mobility, which includes recording the transportation mode over a large metropolitan area. However, when it is based on call detailed records (CDR), map matching greatly depends on the number of records, and the running time of the proposed global algorithm is very long. The low-frequency nature of CDRs can be a problem, considering the frequent inaccuracies at the start and at the end of the route.

SUMMARY OF THE INVENTION

The purpose of the present invention is to characterize a route travelled by a user in a robust manner, even with measurements comprising outliers, or truncated measurements (limited number of measurements for some route portions). The present invention therefore is a method for characterizing a route travelled by a user. The method comprises a step of location and timestamp measurement during the ride, then a step of determining a modified discrete Fréchet distance between the measured route and previous routes. Finally, the modified discrete Fréchet distance is used to characterize the route to be characterized. The modified discrete Fréchet distance allows determination of similar previous routes in a robust manner.

The invention relates to a method of characterizing a route travelled by a user by use of a database comprising data relative to previous routes. The following steps are carried out for this method:
a) measuring, by use of a geolocation sensor, the position and the timestamp of a plurality of points of the route to be characterized;
b) for at least two previous routes of the database, determining a distance between the route to be characterized and each one of the at least two previous routes by use of the modified discrete Fréchet distance, by carrying out the following steps:
   i) determining an optimum sequencing of point pairs between the route to be characterized and the previous route, by minimizing the distance between the point pairs;
   ii) determining the modified discrete Fréchet distance by the mean of the distances between the point pairs of the optimum sequencing,
c) characterizing the route to be characterized by comparing the distances determined between the at least two previous routes in the database and the route to be characterized.

According to an embodiment, the characterization concerns the classification of the route to be characterized into a representative cluster of routes.

According to an embodiment, the characterization concerns the determination of at least one transportation mode of the user for the route to be characterized.

Advantageously, the route to be characterized is segmented into at least two subroutes and the at least one transportation mode of the user is determined for each subroute.

Advantageously, the at least one transportation mode is determined by comparison with a multimodal route planning tool.

Preferably, the multimodal route planning tool comprises travel maps and public transport data.

According to an implementation, each modified discrete Fréchet distance that is determined is compared with a threshold with preferably the threshold being less than 500 m, and more preferably the threshold is less than 250 m. The characterization is carried out the following steps:
   i) if the modified discrete Fréchet distance determined is less than or equal to said threshold value, then the route to be characterized is assigned the same characterization as said corresponding previous route; and
   ii) if the modified discrete Fréchet distance determined is greater than the threshold value, then no characterization is assigned to the route to be characterized.

According to an aspect, at least one complementary parameter of the route to be characterized is measured with the complementary parameter being selected from among the speed of the user, the acceleration of the user, the accuracy of the geolocation sensor, the altitude of the user, and an additional criterion is used to characterize the route to be characterized according to the complementary parameter.

According to a feature, the modified discrete Fréchet distance is determined by limiting, in the optimum sequencing of point pairs, the number of connections for a single point of a route with preferably the limit number of connections ranging between 3 and 10 and more preferably between 4 and 7.

According to an option, the modified discrete Fréchet distance is determined after eliminating the maximum values of the distance in the optimum sequencing of point pairs.

According to an embodiment, the method further comprises a measurement preprocessing step through distance-based spatial interpolation.

According to an implementation, the database of the previous routes comprises only previous routes travelled by the user, with at least the geolocation and timestamping data of the previous routes.

According to an aspect, the database comprises information related to the transportation mode for at least one previous route.

According to an aspect, the database comprises at least one cluster representative of the previous routes.

Furthermore, the invention relates to at least one of a computer program product downloadable from a communication network, recorded on a computer readable medium and processor or server executable, comprising program code instructions for implementing the method according to any one of the above features, when the program is executed on a computer or a mobile phone.

BRIEF DESCRIPTION OF THE FIGURES

Other features and advantages of the method according to the invention will be clear from reading the description hereafter of embodiments given by way of non-limitative example, with reference to the accompanying figures wherein.

DETAILED DESCRIPTION OF THE INVENTION

The present invention relates to a method for characterizing a route travelled by a user. A route travelled by a user is understood to be a ride taken by a user between an origin and a destination with any type of transport (vehicle, bicycle, public transport: bus, tramway, train, underground, pedestrian trip, etc.). For a single route, the user can take several different types of transport which is then referred to as multimodal route (for example a combination of public transport, or a combination of public transport and pedestrian trip, or bicycle trip, etc.). The route travelled by the user is referred to as route to be characterized in the rest of the description below. Characterization concerns the determination of at least one characteristic representative of the route. According to a preferred embodiment of the invention, characterization can concern the determination of the transportation mode(s) that is the type of transport). Alternatively or additionally, characterization can concern the belonging of the route to be characterized to a representative cluster of routes, the routes belonging to the same representative cluster of routes with similar attributes, in particular similar paths.

The characterization method uses a database comprising previous route data. Previous routes are routes travelled prior to the route to be characterized, and for which data is available and in particular location and timestamp. The database can further comprise other data relative to the previous routes, for example the transportation mode, the user's speed and the user's altitude, etc. The database can be stored in a computer memory. According to an embodiment of the invention, the database may comprise only data relative to the previous routes travelled by the user of the route to be characterized. Thus, the route characterization can be representative of the user's habits. In a variant, the database can comprise data relative to previous routes travelled by multiple users. Thus, the database can comprise a large number of previous routes, which provides more accurate characterization of the route to be characterized.

The method according to the invention comprises the following steps:
position measurement and timestamping of the route to be characterized;
determination of modified discrete Fréchet distances; and
characterization of the route to be characterized.

These steps are described in detail in the rest of the description. The steps of determining modified discrete Fréchet distances and route characterization can be carried out by a computer system. Such a computer system can include a computer memory, a computing processor and communications, notably for communication with the measurement device.

Figure 1:
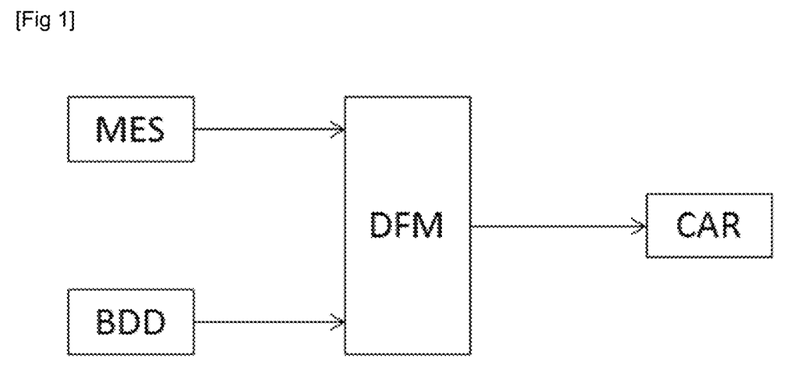
FIG. 1 illustrates the steps of the method according to a first embodiment.

FIG. 1 schematically illustrates, by way of non-limitative example, the steps of the method according to a first embodiment of the invention. A database BDD comprises previous route data. During the ride on the route to be characterized, the position and the timestamp are measured MES. These measurements and the data from database BDD are then used to determine a modified discrete Fréchet distance DFM between the route to be characterized and the previous routes. This modified discrete Frechet distance DFM then allows determination of the characterization CAR of the route to be characterized.

Figure 2:
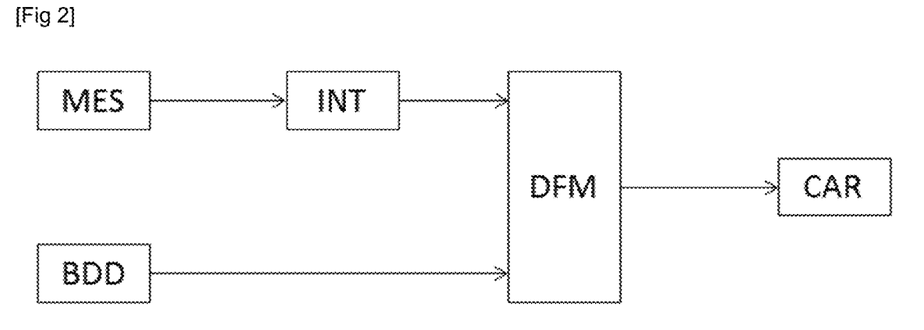
FIG. 2 illustrates the steps of the method according to a second embodiment.

According to an embodiment of the invention, the method can comprise an additional step of measurement preprocessing prior to the step of determining modified Fréchet distances. This measurement preprocessing step allows measurement sampling to be improved.

For this second embodiment, the method comprises the following steps:
position measurement and timestamping of the route to be characterized;
measurement preprocessing;
determination of modified discrete Fréchet distances; and
characterization of the route traveled by the user.

These steps are described in detail in the rest of the description. The steps of measurement preprocessing, determining modified Fréchet distances and route characterization can be carried out by a computer system. Such a computer system can include a computer memory, a computing processor and communications, notably for communication with the measurement device.

FIG. 2 schematically illustrates, by way of non-limitative example, the steps of the method according to the second embodiment of the invention. A database BDD comprises previous route data. During the ride on the route to be characterized, the position and the timestamp are measured MES. Measurements MES are preprocessed INT. These preprocessed measurements and the data from database BDD are then used to determine a modified discrete Fréchet distance DFM between the route to be characterized and the previous routes. This modified discrete Fréchet distance DFM then allows determination of the characterization CAR of the route traveled by the user.

Figure 3:
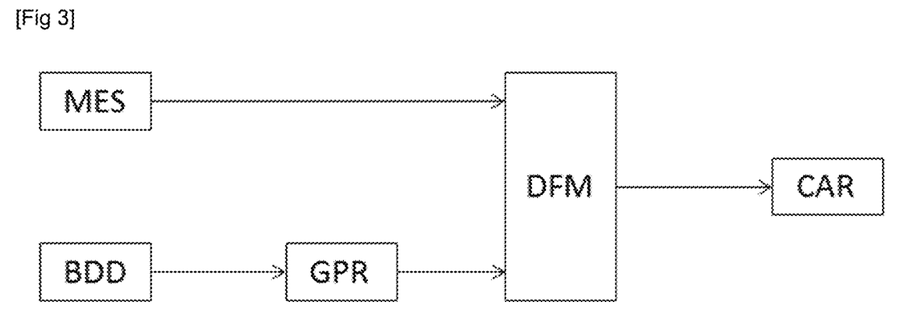
FIG. 3 illustrates the steps of the method according to a third embodiment.

According to an embodiment of the invention, the database can comprise at least one representative cluster of routes. For this embodiment, the modified Fréchet distance can be determined for a single previous route of each representative cluster of routes which is preferably a previous route for which the transportation mode is known. Thus, the number of modified Fréchet distances determined is limited which reduces the computing time.

FIG. 3 schematically illustrates, by way of non-limitative example, the steps of the method according to the third embodiment of the invention. A database BDD comprises previous route data and clusters representative of previous routes GPR. During the ride on the route to be characterized, the position and the timestamp are measured MES. These measurements, the data from database BDD and representative clusters GPR are then used to determine a modified discrete Fréchet distance DFM between the route to be characterized and the previous routes of each representative cluster GPR. This modified discrete Fréchet distance DFM then allows determination of the characterization CAR of the route to be characterized.

The embodiments of FIGS. 2 and 3 can be combined so as to combine the effects thereof.

Position Measurement and Timestamping of the Route Traveled by the User

This step measures, by use of a geolocation sensor, the position and the timestamp of points of the route to be characterized.

The geolocation sensor can be a satellite-based positioning sensor, such as the GPS system (Global Positioning System), the Galileo system, etc. The geolocation sensor can be an in-vehicle or a remote sensor (using a smartphone for example). Preferably, the geolocation sensor can be integrated in a smartphone which is suited to any type of transportation mode.

Time stamping can be used notably for preprocessing (see next step).

Alternatively, interpolation can also be performed with a virtual timestamp.

Measurement Preprocessing

It is to be noted that this step is optional and that it corresponds to the second embodiment of the invention illustrated in FIG. 2. This step preprocesses the measurements, preferably by use of a distance-based spatial interpolation (in other words, by imposing a minimum distance between two consecutive measurement points), in order to improve sampling of the measurements.

Indeed when the measurements being performed by the geolocation sensor in a discrete manner, the first step provides knowledge of the geolocation of measurement points. However, when the vehicle is stopped, and as a result of the inaccuracy that may be related to the geolocation sensor, the weather conditions, or when driving through a tunnel, etc., measuring the route to be characterized can comprise several more or less spaced-apart measurement points, whereas they theoretically correspond to the same physical point of the route travelled. This disparity of the measurement points can generate less coherent determination of the mean Fréchet distances, which may result in a less accurate characterization of the route to be characterized.

According to an example embodiment, this preprocessing allows the data to be sampled so as to have a point every 50 m (or 25 m, 100 m, 150 m, etc.). Indeed, the GPS type geolocation sensor can generally perform the measurements at a frequency of 1 Hz, therefore, when the user stops for example at a red light, there are many points in the same place, which may increase the Fréchet distance even in the absence of motion.

Determination of the Modified Discrete Fréchet Distance

In this step, for at least two previous routes in the database, a distance is determined between the route to be characterized and the previous route, by use of the modified discrete Fréchet distance. It is noted that the "conventional" Fréchet distance between routes A and B can be informally described as the length of the shortest leash allowing a person on a route A to walk their dog on a route B (without moving backwards). The modified discrete Fréchet distance is understood to be a determination of a distance based on the method used for calculating the "conventional" Fréchet distance, wherein a mean of the distances between the two routes considered is calculated in a discrete manner instead of being the greatest distance between the points of the two routes being considered. This modified discrete Fréchet distance eliminates some outliers.

The modified discrete Fréchet distance comprises constructing in the same way as for the conventional Fréchet distance:
- a polyline connecting the points of the route to be characterized,
- a polyline connecting the points of the previous route, and
- all the connections that connect a point of each polyline.

Figure 5:
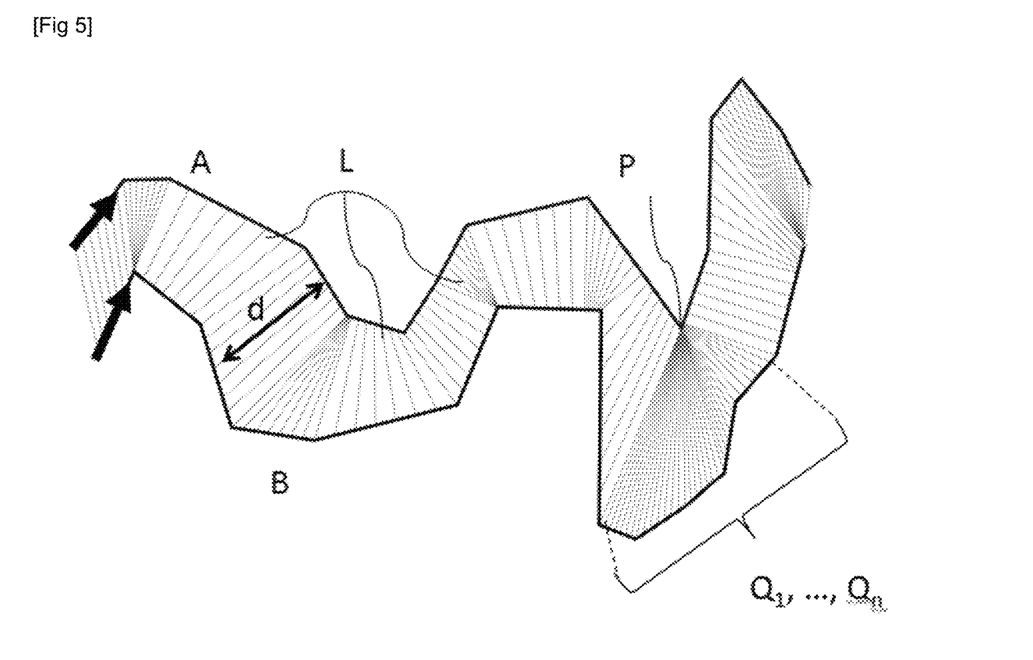
FIG. 5 illustrates the construction of the modified Fréchet distance according to an embodiment of the invention.

The step of determining the connections that connect a point of each polyline is carried out in a dynamic and recursive manner. Two discrete routes X and Y of respective lengths N and M are considered here. The first step relates to the construction of a cumulative distance matrix D containing, in row n and column m, the discrete Fréchet distance calculated from the start of each route to points n and m (where $1 \leq n \leq N$ and $1 \leq m \leq M$). It can then be written:

$$D(n,m) = F_d(Xn, Ym)$$

with $F_d$ being the discrete version of the Fréchet distance, Xn, and being Ym the truncated routes of length n and m. The difference between the continuous and the discrete version of the Fréchet distance is that parametrizations $\alpha$ and $\beta$ are not considered to be continuous time functions, but only the ordering of the route connections.

The matrix can be recursively calculated as follows:

$$D(n,m) = \min(D(n-1,m-1), D(n-1,m), D(n,m-1)) + d(x_n, y_m)$$

where $x_n$ is the n-th element of route X and $y_m$ is the m-th element of route Y, and d is the distance between the n-th element of route X and the m-th element of route Y.

The construction of the connections is then performed in the reverse direction (starting from points N and M to the start of the two routes) by defining the point pairs with the minimum distance, i.e.:

$$P_{i-1} = \arg \min(D(n-1,m-1), D(n-1,m), D(n,m-1))$$

The optimum sequencing $P = [P_n, \ldots P_1]$ is then obtained, where each $P_i$ represents a pair of points $x_k$ and $y_l$. In parallel, it is possible to obtain the optimum distance sequence $d^* = [d_n, \ldots, d_1]$, where $d_i$ represents the metric distance between points $x_k$ and $y_l$ associated with $P_i$.

A modification that can be provided by the invention consists in saturating the number of connections per point P, if $x_k$ (or $y_l$) appears more than sat times in sequencing P (and respectively in sequence $d^*$), the points $P_i$ containing $x_k$ (or $y_l$) are removed and a sequencing $P_{sat}$ (and respectively a sequence $d^*_{sat}$) is then obtained. Then sat is a limit value preferably selected around 5. This distance is referred to as "saturated modified discrete Fréchet distance".

Finally, the modified discrete Fréchet distance is obtained from taking the mean of the distance sequence $d^*$ or $d^*_{sat}$.

Alternatively, the modified discrete Fréchet distance can be obtained by taking the truncated mean of the distance sequence. The truncated mean of a vector is an arithmetic mean measure where the extreme values are discarded. According to an example embodiment, in order to hedge against outliers, the truncated mean may remove only the largest values. This distance is referred to as "truncated modified discrete Fréchet distance".

According to this embodiment, in order to increase the availability of potentially similar routes, it is also possible to calculate thereafter the modified discrete Fréchet distance by reversing the order of route X (the last point becomes the first, etc.). The shortest distance between the two calculations (X in relation to Y and $X_{inv}$ in relation to Y) finally needs to be selected. This embodiment guarantees the robustness of the method in relation to the direction of the route. Indeed, if the user travels route X from Xn to X1 and this route is compared with a previous route from X1 to Xn, and if the modified discrete Fréchet distance is calculated between these two routes, it may be very large, which can be penalizing from being the same route travelled in the reverse direction.

FIG. 5 schematically illustrates, by way of non-limitative example, the determination of the modified discrete Fréchet distance according to an embodiment of the invention. In this figure, it is desired to determine the modified discrete Fréchet distance between a route A represented by polyline A and a route B represented by polyline B. Routes A and B are travelled in the direction shown by the arrows. This figure shows the connections L between each route A and B (which might correspond to a leash between the walker on route A and the dog of route B). Connections L have a variable distance d. It is noted that each point of a route can be connected to several points of the other route. For example, point P of route A is connected to points $Q_1, \ldots, Q_n$ of route B. For the modified discrete Fréchet distance, the mean of the distance d for all the points is considered, for example by use of at least one of the saturated and the truncated modified discrete Fréchet distance. Furthermore, according to an embodiment, these steps can be repeated by reversing the flow direction of one of the two routes.

According to an embodiment, the modified discrete Fréchet distance can be determined by limiting the number of connections for a single point of a route, preferably the limit number of connections ranges between 3 and 10, more preferably between 4 and 7, and it may be equal to 5. In other words, for this embodiment, the number of connections starting from each point is limited. With reference to FIG. 5, this results in point P only being connected to a limited number of points $Q_1, \ldots, Q_n$. This embodiment allows calculation of the modified discrete Fréchet distance between two routes, even if one route is much shorter than the other. This is also possible with the usual embodiment of the Fréchet distance. However, in the case of a route much shorter than the other, the conventional Fréchet distance will be very large even if a subpart of the long route is similar to the short route. Thus, routes of any length can be easily characterized.

According to an embodiment, the modified discrete Fréchet distance can be determined by limiting the number of connections for a single point of a route, preferably the limit number of connections ranges between 3 and 10, more Characterization of the Route to be Characterized This step characterizes the route to be characterized by comparison of the modified discrete Fréchet distances determined in the previous step between the at least two previous routes of the database and the route to be characterized.

According to an embodiment, each modified discrete Fréchet distance determined in the previous step can be compared with a threshold. Preferably the threshold is less than 500 m, more preferably the threshold is less than 250 m. Characterization can be carried out by use of the following steps:

i) if the modified discrete Fréchet distance that is determined is less than or equal to the threshold, the route to be characterized is assigned the same characterization as the corresponding previous route; and ii) if the modified discrete Fréchet distance determined is greater than the threshold, no characterization is assigned to the route to be characterized.

This threshold range allows similar routes to be identified. Preferably, the threshold can be substantially equal to 200 m.

Alternatively, the route to be characterized can be assigned the characterization of the previous route that minimizes the modified discrete Fréchet distance. According to another alternative, the two criteria can be cumulated: the minimum value can be compared with a threshold, and the route to be characterized can be characterized if the minimum value is less than the threshold.

According to an embodiment of the invention, at least one complementary parameter of the route to be characterized can be measured, and this complementary parameter can be selected from among the user's speed, the user's acceleration, the accuracy of the geolocation sensor, the user's altitude, and an additional criterion can be used to characterize the route traveled by the user according to the complementary parameter. For example, by use of the reduced modified discrete Fréchet distance (that is at least one of minimal and below a threshold), it is possible to know the course of the route to be characterized and which type of journey was made (urban driving, motorway, cycle path, etc.), and the user's travel speed allows differentiation of at least one of the transportation mode and the cluster representative of the routes.

According to an option, this step can also comprise recording the route travelled and characterized in the previous route database. The route thus travelled and characterized then becomes a previous route for reiteration of the method for another route travelled by the user. Thus, the database is completed with each use, which promotes the characterization reliability.

According to a first variant of this step, characterization can concern the belonging of the route to be characterized to a representative cluster of routes. For this variant, the route to be characterized can be assigned the same representative cluster of routes as the previous route in the database (embodiment of FIG. 3) for which the modified discrete Fréchet distance is reduced (i.e. minimal and/or below a threshold).

According to a second variant of this step, characterization can concern detecting the transportation mode used for the route to be travelled. Whatever the implementation of this second variant, for this step, the route to be characterized can be segmented into subroutes and each subroute can be assigned a transportation mode. Thus, this embodiment allows multimodal routes (with different transportation modes) to be taken into account.

A first implementation of this variant may assign the transportation mode of the previous route for which the modified discrete Fréchet distance is reduced (that is at least one minimal and below a threshold). This implementation implies that at least one previous route of the database comprises a datum relative to the transportation mode of this previous route.

A second implementation of this variant can compare the route to be characterized with at least one route obtained with a multimodal route planning tool. This tool provides transportation analysis and multimodal route planning services. This multimodal planning tool can notably comprise a travel map and public transport data. A route obtained with this tool can be segmented so that the specific transportation mode is clearly defined for each route portion. Comparing the route to be characterized with at least one route obtained with a multimodal route planning tool can be done by use of the modified discrete Fréchet distance used in the previous step. The route to be characterized is then assigned the transportation means (one or more) corresponding to the route obtained with this multimodal route planning tool having a reduced modified discrete Fréchet distance (that is at least one of minimal and below a threshold). According to an aspect of this implementation, the multimodal route planning tool can be available as a web service. In this case, the computer means implemented in the method according to the invention can include connection to the web service, notably an internet connection.

Figure 4:
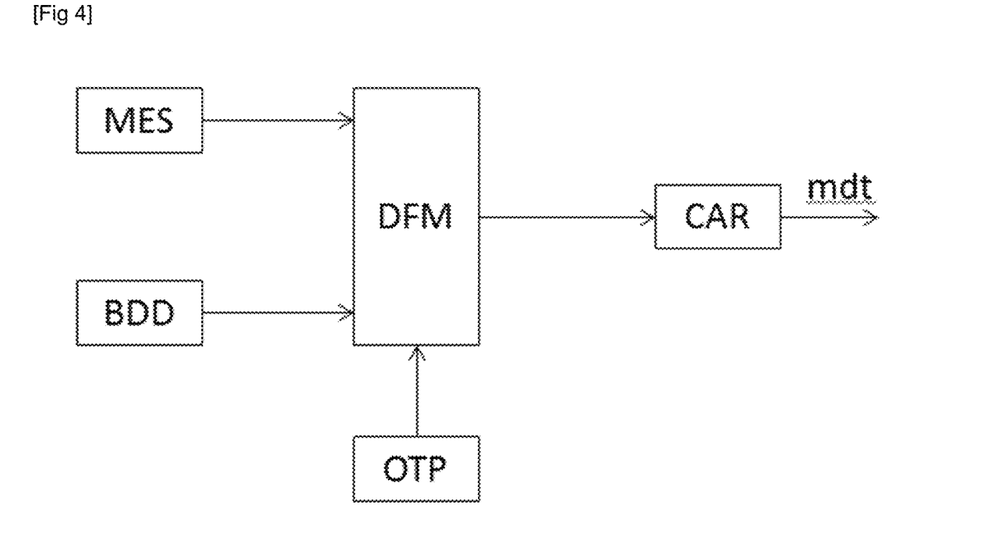
FIG. 4 illustrates the steps of the method according to a fourth embodiment.

FIG. 4 schematically illustrates, by way of non-limitative example, the characterization method according to this implementation. A database BDD comprises data relative to previous routes. During the ride on the route to be characterized, the position and the timestamp are measured MES. These measurements and the data from database BDD are then used to determine a modified discrete Fréchet distance DFM between the route to be characterized and the previous routes. Furthermore, a modified discrete Fréchet distance DFM is determined between the route to be characterized and a route obtained from a multimodal route planning tool OTP. These modified Fréchet distances DFM then allow determination of the characterization CAR of the route to be characterized which is here the transportation mode mdt.

According to a third variant of this step, characterization can comprise the detection of the transportation mode used on the route to be travelled and the belonging of the route to be characterized to a representative cluster of routes.

For this third variant, the first variant can be combined with one of the implementations of the second variant described above. For example, the belonging of the route to be characterized to a representative cluster of routes can first be determined. The route to be characterized is then assigned the transportation mode corresponding to the representative cluster of routes. This example embodiment implies that each representative cluster of routes comprises at least one previous route for which a transportation mode is identified.

Moreover, the characterization method can comprise a step of constructing representative clusters of routes of the database. For example, this representative cluster construction step can be carried out by an application of the modified discrete Fréchet distance, by pairwise comparison of the previous routes of the database.

The method can comprise an optional step of displaying the characterization of the route travelled. In this optional step, the characterization can be displayed on a road map. This display can involve a rating or a color code (for example, at least one of a color per transportation mode and a color per cluster). It can be displayed on-board a vehicle: on an autonomous mobile device such as a geolocation device (of GPS type), a mobile phone (of smartphone type). It is also possible to display the characterization of the route to be characterized on a website.

The invention further relates to a computer program product downloadable from at least one of a communication network, and recorded on a computer readable medium and a processor or server executable. This program comprises code instructions for implementing the method as described above, when the program is executed on at least one of a computer, a mobile phone, or any similar system.

EXAMPLES

The advantages of the method according to the invention will be clear from reading the application examples described hereafter.

For the examples, routes measured by a geolocation sensor contained in a smartphone are characterized. The measured routes and the previous routes are in the greater Lyon area.

Figure 6:
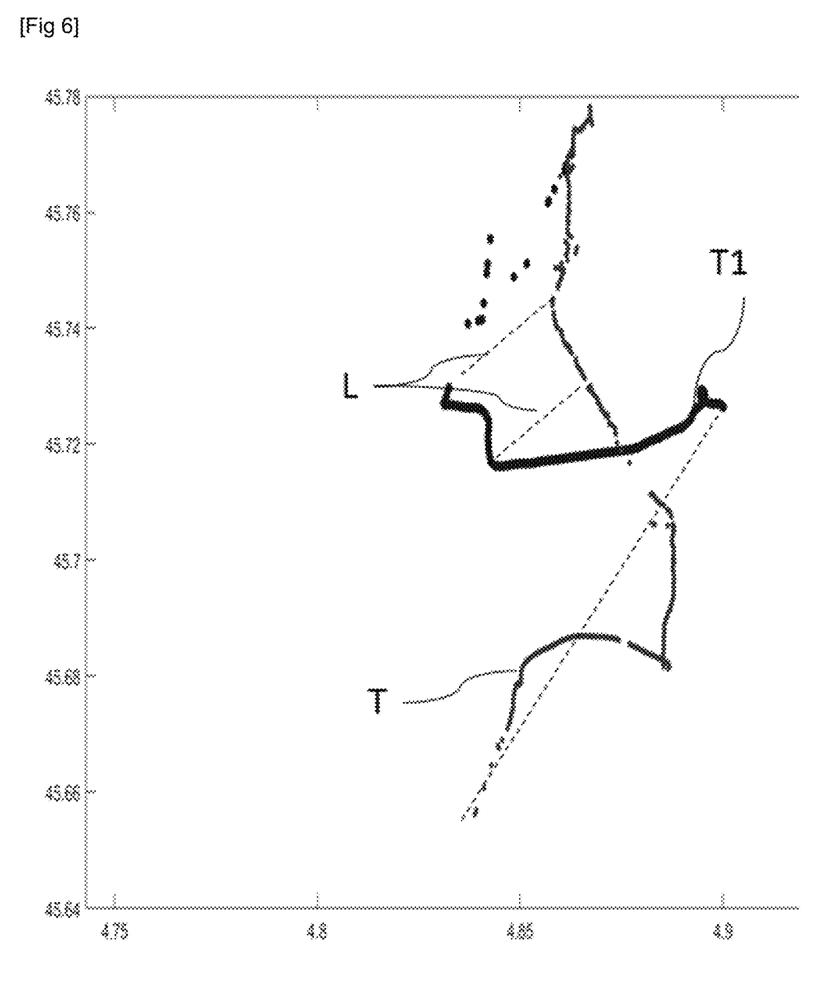
FIG. 6 illustrates, for an example, the determination of the Fréchet distance for a route to be characterized with a first previous route.
Figure 7:
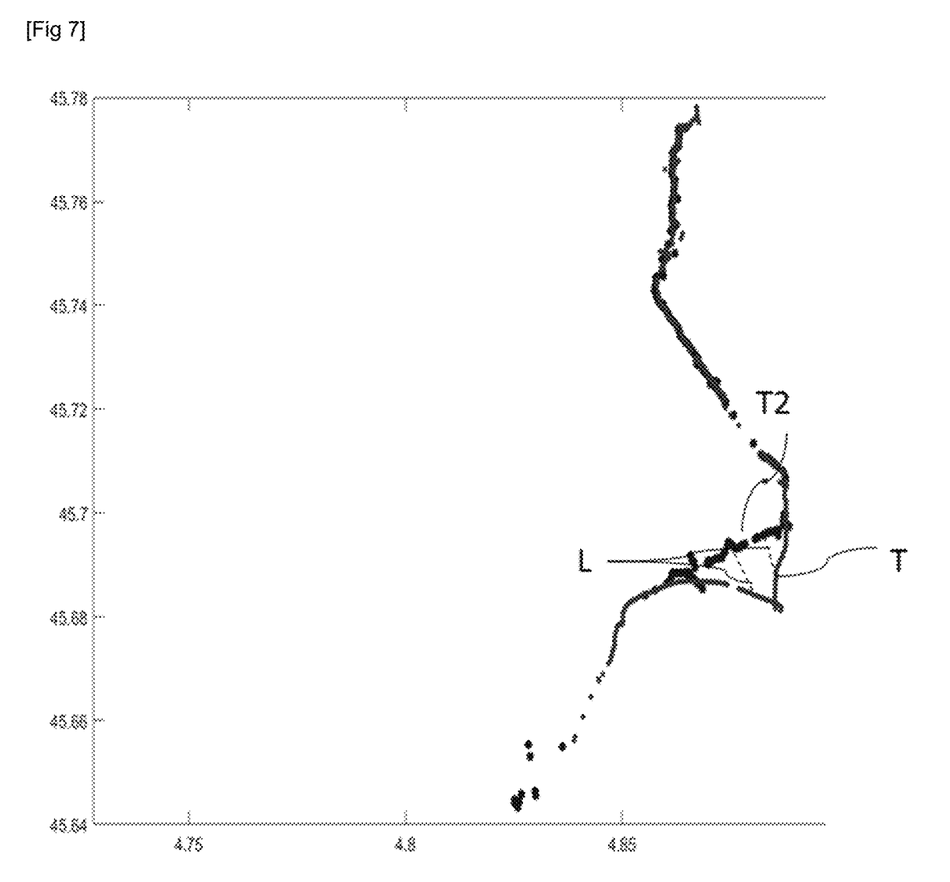
FIG. 7 illustrates, for an example, the determination of the Fréchet distance for a route to be characterized with a second previous route.

For the first example, two previous routes are considered, and the modified discrete Fréchet distance between the route to be characterized and each of the two previous routes is determined by use of the method according to the invention. FIGS. 6 and 7 show two maps of the greater Lyon area. For the sake of map readability, the roads are not represented. FIG. 6 illustrates the route to be characterized T and the first previous route T1, as well as several connections L between the points of the first route to be characterized T and the first previous route T1 (not all of the connections are shown). The map of FIG. 7 illustrates the route to be characterized T and the second previous route T2, as well as several connections L between the points of the first route to be characterized T and the second previous route T2 (not all of the connections are shown). It is noted that the route to be characterized T is similar to previous route T2, indeed the route to be characterized T is partly superimposed on previous route T2. For each previous route, the modified discrete Fréchet distance is determined according to the method of the invention. For previous route T1, the modified discrete Fréchet distance is 2241 m, whereas for previous route T2, the modified discrete Fréchet distance is 41 m. Thus, the route to be characterized T can be assigned the characterization of previous route T2, for example the cluster representative of previous route T2.

Figure 8:
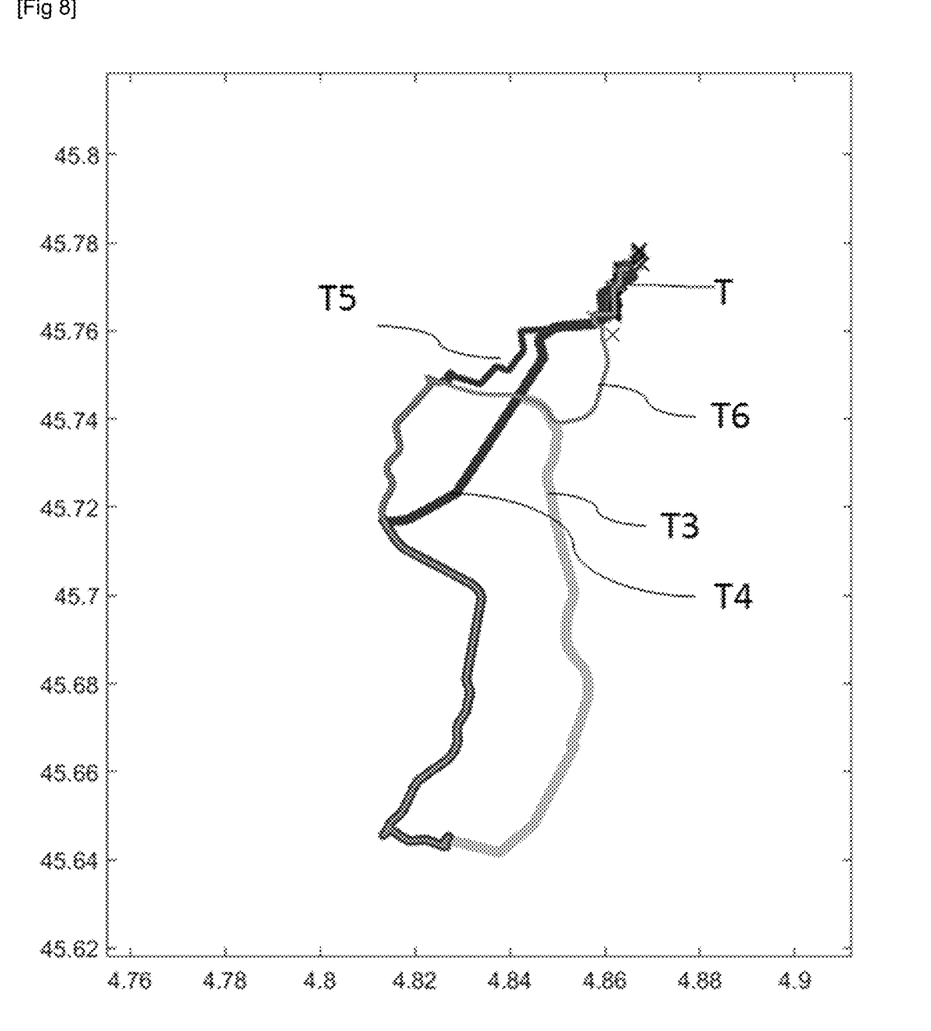
FIG. 8 illustrates, for an example, a transportation mode identification using a route planning tool.

The second example corresponds to the embodiment of FIG. 4: which determines the transportation mode by use of a multimodal route planning tool. Various routes are first determined using the multimodal route planning tool. The modified discrete Fréchet distance between the travelled route and each route obtained by use of the multimodal route planning tool is then determined. FIG. 8 shows a map of the greater Lyon area. For the sake of readability, the roads are not shown. FIG. 8 illustrates the travelled route T represented by crosses and the various routes T3, T4, T5, T6 obtained by the multimodal route planning tool. In this case, the route to be characterized appears as a subroute of a set of routes obtained by the multimodal route planning tool. The modified Fréchet distance of route T3 is 129.58 m, that of route T4 is 130.53 m, that of route T5 is 18.61 m and that of route T6 is 19.75 m. Thus, the route can be assigned the transportation mode of route T5, which minimizes the modified discrete Fréchet distance. It is thereby possible to determine that the ride on the travelled route was taken with the Lyon tramway T1, which matches the information provided by the user.

Thus, the method according to the invention allows characterization in a robust manner a route travelled by a user, by use of measurements provided by a geolocation sensor.

The invention claimed is:

1. A method of characterizing a subsequent travel route of a user using a database storing data from previous travelled routes which is used to characterize the subsequent travel route, comprising:

a) using a geolocation sensor positioned on the subsequent travel route to sense positions on the subsequent travel route and a timestamp of sensed positions on the subsequent route;
b) determining, from the previous routes stored in the database, a distance between the subsequent route and the previous routes which are within a cluster of routes by using a modified discrete Fréchet distance comprising:
  i. determining an optimum sequencing of point pairs between the stored subsequent route and the stored previous routes which minimizes distance between the point pairs or the subsequent route and the previous routes; and
  ii determining a modified discrete Fréchet distance of distances between the point pairs from an optimum sequencing of the point pairs;
c) characterizing the subsequent route by comparing the determined modified discrete Fréchet distances between the at least two previous routes and the subsequent route;
d) using a multimode planning tool to process the modified discrete Fréchet distances to determine a transportation mode of travel on the subsequent route; and
e) travelling the subsequent route with a vehicle in accordance with the determined transportation mode of travel.

2. A method as claimed in claim 1, wherein the characterized subsequent route is segmented into at least two subroutes, and the at least one transportation mode is determined for each subroute.

3. A method as claimed in claim 1, wherein a multimode planning tool is used to characterize the subsequent route which comprises travel maps and public transport data.

4. A method as claimed in claim 1, wherein each modified discrete Fréchet distance is compared with a threshold, has a value less than 250 m, and the characterization of the subsequent route comprises steps of:
  i. if the modified discrete Fréchet distance is less than or equal to the threshold, the subsequent characterized route is assigned an identical characterization as one of the previous routes; and
  ii. if the modified discrete Fréchet distance is greater than the threshold, then no characterization is assigned to the subsequent characterized route.

5. A method as claimed in claim 1, wherein at least one complementary parameter of the characterized subsequent route is measured, which is selected from among speed of a vehicle, acceleration of the vehicle, accuracy of the geolocation sensor and altitude of the vehicle, and an additional criterion is used to characterize the subsequent route according to the at least one complementary parameter.

6. A method as claimed in claim 1, wherein the modified discrete Fréchet distance is determined by limiting, in the optimum sequencing of point pairs of the subsequent route by limiting to a range between 3 and 10.

7. A method as claimed in claim 1, wherein the modified discrete Fréchet distance is determined after eliminating maximum values of distance in the optimum sequencing of the point pairs.

8. A method as claimed in claim 1, comprising processing the routes with distance-based spatial interpolation.

9. A method as claimed in claim 1, wherein the previous stored routes comprise only previous routes travelled by a user, which include geolocation and timestamped data from the previous routes.

10. A method as claimed in claim 1, wherein the database comprises information related to a transportation mode used for travel of at least one of the previous routes.

11. A method as claimed in claim 1, wherein the database stores at least one cluster of routes representative of the previous routes.

12. A non-transitory computer-readable storage medium storing a computer program, wherein the computer program comprises instructions for implementing the method as claimed in claim 1, when the program is executed on a computer or a mobile phone.

* * * * *